(12) United States Patent
Tyree

(10) Patent No.: US 7,510,021 B2
(45) Date of Patent: Mar. 31, 2009

(54) HOOF CARE STAND

(76) Inventor: Kenna Rose Tyree, P.O. Box 195, Oak Run, CA (US) 96069

( * ) Notice: Subject to any disclaimer, the term of this patent is extended or adjusted under 35 U.S.C. 154(b) by 0 days.

(21) Appl. No.: 11/649,344

(22) Filed: Jan. 3, 2007

(65) Prior Publication Data

US 2008/0156504 A1    Jul. 3, 2008

(51) Int. Cl.
*A01L 11/00* (2006.01)
(52) U.S. Cl. ...................................... 168/44
(58) Field of Classification Search ............... 168/44; D30/143; 119/723, 722, 724, 753, 755–757, 119/712; 248/599, 600, 601, 158, 160, 162.1, 248/406.2, 523, 594, 618, 664; 297/258.1, 297/314, 265.1, 325, 423.42, 423.14
See application file for complete search history.

(56) References Cited

U.S. PATENT DOCUMENTS

| | | | | |
|---|---|---|---|---|
| 805,522 | A | * | 11/1905 | Bethke ...................... 248/600 |
| 1,058,655 | A | * | 4/1913 | Bates et al. ................. 248/601 |
| 1,168,467 | A | * | 9/1916 | Maltby ........................ 168/44 |
| 1,278,628 | A | * | 9/1918 | France et al. ................. 168/44 |
| 2,702,073 | A | * | 2/1955 | Brill ........................ 297/303.5 |
| 3,188,141 | A | * | 6/1965 | Wright .................. 297/423.42 |
| 4,294,426 | A | * | 10/1981 | Fleischer .................... 248/561 |
| 4,974,904 | A | * | 12/1990 | Phillips et al. ........... 297/258.1 |
| 2002/0108758 | A1 | * | 8/2002 | Keeler .......................... 168/44 |
| 2006/0113090 | A1 | * | 6/2006 | DeCola et al. ................ 168/44 |
| 2007/0119601 | A1 | * | 5/2007 | Leonard ...................... 168/44 |

* cited by examiner

*Primary Examiner*—Son T. Nguyen
(74) *Attorney, Agent, or Firm*—Henneman & Associates, PLC; Larry E. Henneman, Jr.

(57) ABSTRACT

A hoof care stand (10) for receiving the leg of an animal, preferably the front leg (18) or rear leg (18a) of a horse, for care thereof. The hoof care stand (10) has a two dimensionally curved leg receiving portion (16) with padding (20) on an inner surface (32) thereof. The leg receiving portion (16) is flexibly attached relative to a base (12) using a flexible attaching member (22) such as a spring. An attachment rod (24) provides for vertical adjustment of the leg receiving portion (16) relative to the base (12) and is selectively held in place therein by an adjusting screw (26).

18 Claims, 3 Drawing Sheets

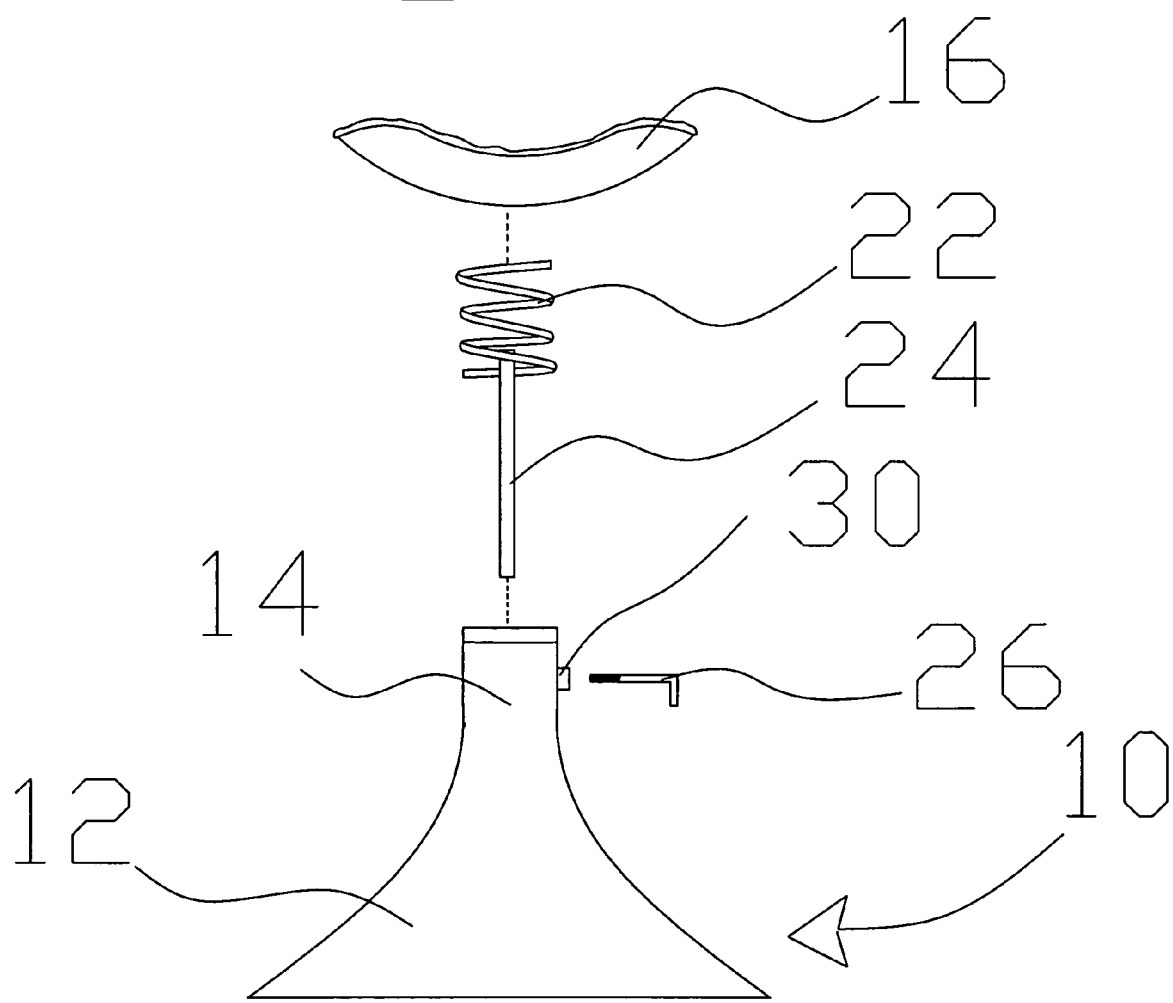

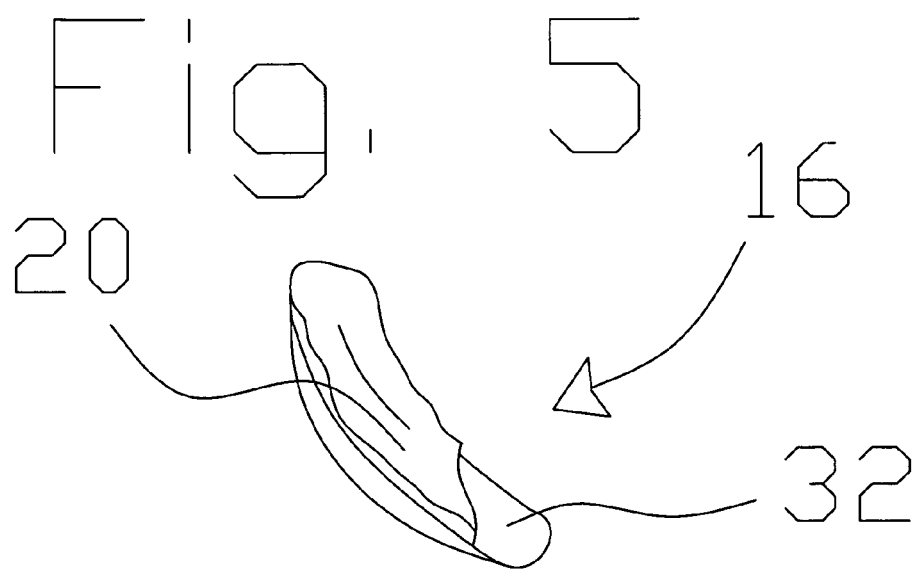
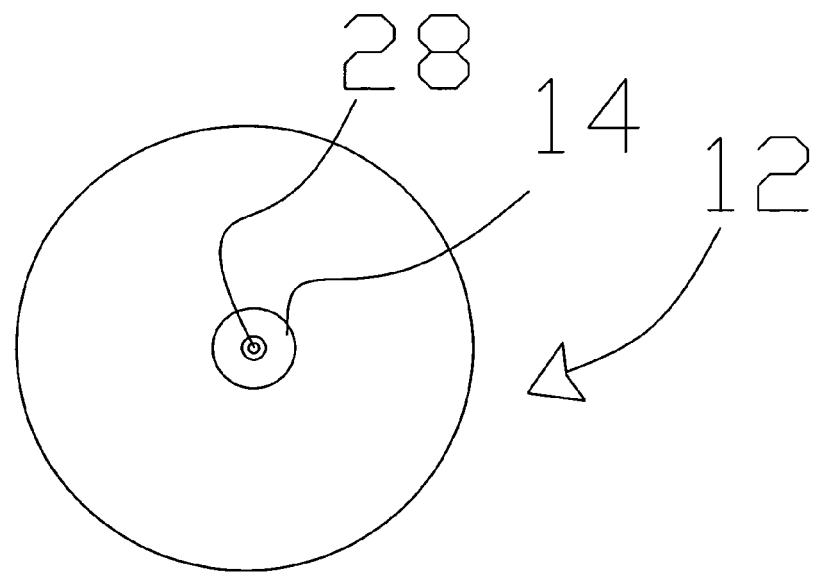

HOOF CARE STAND

BACKGROUND OF THE INVENTION

1. Field of the Invention

The present invention relates to the field of tools for animal care, and more particularly to a means for positioning and holding the hoof of an animal, particularly of a horse. The predominant current usage of the present inventive hoof care stand is as an aid to cleaning and shoeing the hooves of horses.

2. Description of the Background Art

Most farriers physically support the leg of a horse during shoeing operations, and the like, by holding the horse's leg between their own legs, with the horse leg coming through the farrier's legs from the farrier's backside. This is a precarious, sometimes dangerous position and always a physically-demanding position. First, the farrier must remove the old horseshoe. Then the hoof must be trimmed and filed. Next, the new shoe must be fitted to the hoof profile and nailed in place. Finally, the nails are clinched and the anterior profile of the hoof is filed and shaped. All of these operations are best performed with the hoof supported at an elevation above ground level.

In an effort to avoid this problem several implements have been devised to hold, or assist in holding, the leg of a horse or similar animal. For example, U.S. Pat. No. 4,167,216, issued to Beaston, teaches a Multiple Stand To Aid Shoeing Horse which has a two-position tripod-type stand having a pair of alternating upright members disposed at a right angle with respect to one another. A pair of opposing legs are connected to the vertex joint of the uprights, each at a slightly obtuse angle with respect to both uprights. In one position, one upright extends vertically upward while the second upright acts as the third leg of the tripod. In the second position, the second upright extends vertically upward while the first upright acts as the third leg of the tripod. A hard hoof cradle is attached to the distal end of one of the uprights and a flat plate is attached to the distal end of the other upright. The cradle holds the hoof in an elevated generally horizontal position to provide access to the bottom of the hoof, while the flat plate provides an elevated platform to support the bottom of the hoof to provide convenient access to the anterior of the hoof. An optional upright with an anvil attachment can be removably substituted for either of the other two uprights.

U.S. Pat. No. 89,379, issued to Blackburn, discloses a rest for shoeing horses with a thick base and a hinged, v-shaped member upon which the horse hoof rests. The arms of the v-shaped member extend vertically upward, and one of the arms is hinged to pivot to the side when the weight of the hoof is placed on the v-shaped member. The Blackburn device includes an incremental ratchet adjustment to raise and lower the v-shaped member relative to the base.

Additionally, U.S. Pat. No. 5,979,562 issued to Hammonds, and U.S. Pat. Nos. 6,325,154; 6,640,905; and 6,848,512, all issued to Keeler, teach variations of stands for holding and positioning the lower leg of a horse while the horse is being shoed, or its hoofs cleaned, or the like.

The inventor believes that all known prior art devices, while useful for their intended purposes, are less than ideal in many situations. For example, many horses may be less than ideally cooperative when one is trying to position their leg. Therefore, any device that forces the user to pre-adjust an exact position for the horse's leg might not be effective for such animals. Furthermore, it should be noted that any horse might, on some occasion, jerk or bolt away from the farrier or other user. Therefore, any it is important to provide a device which will minimize the risk of injury to the animal in such circumstances.

What is needed is a device that will be comfortable and safe for both the human user and the horse. However, to the inventor's knowledge, all known prior art devices have not provided a complete solution to the above described problems.

SUMMARY

Accordingly, it is an object of the present invention to provide an apparatus for positioning the leg and hoof of a horse during shoeing or cleaning operations.

It is still another object of the present invention to provide an apparatus which is comfortable for the horse.

It is yet another object of the present invention to provide an apparatus whereby it will be easy for the user to position the horse's leg.

It is still another object of the present invention to provide an apparatus that is safe for both the horse and the user.

Briefly, a known embodiment of the present invention is a hoof care stand having a generally broad and flat base for stability, and an upright portion for holding in position a leg receiving portion. The leg receiving portion is flexibly mounted to the upright portion such that the leg receiving portion can be moved slightly to accommodate movement of the horse, and further to allow position of the horse's leg therein even when the horse is not ideally cooperative. The leg receiving portion is curved so as to comfortably accept the horse's leg, and further such that the horse's leg is held therein without the need for additional devices to hold the leg within the leg receiving portion. The interior of the leg receiving portion is padded, for the comfort and safety of the horse. Furthermore, the combination of the shape of the leg receiving portion and the padding minimizes the risk of injury to the horse, should the horse jerk or bolt out of the hoof care stand. The height of the leg receiving portion relative to the base is optionally adjustable.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the described objects and/or advantages. Accordingly, the objects and/or advantages described herein are not essential elements of the present invention, and should not be construed as limitations.

BRIEF DESCRIPTION OF THE DRAWINGS

FIG. 3 is a partially exploded perspective view of the example of the hoof care stand of FIGS. 1 and 2.

FIG. 4 is a top plan view of an example of a the base portion of the hoof care stand;

FIG. 5 is a partially cut away perspective view of the leg receiving portion of FIGS. 1 and 2; and

DETAILED DESCRIPTION OF THE INVENTION

Figure 2:
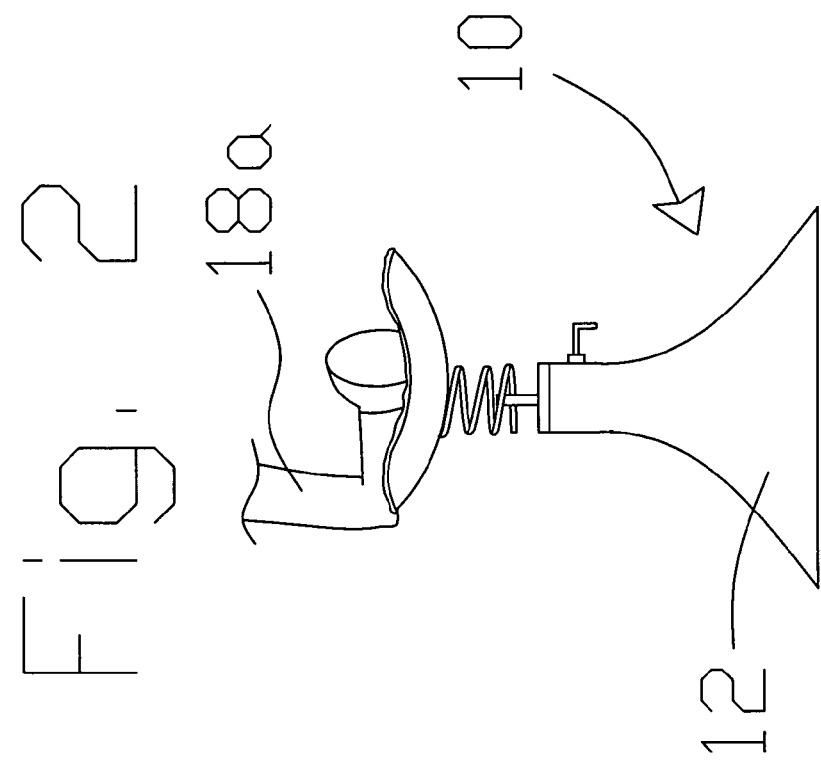
FIG. 2 is a side elevational view of the example of the inventive hoof care stand of FIG. 1, showing a horse's rear leg resting therein.

This invention is described in the following description with reference to the Figures, in which like numbers represent the same or similar elements. While this invention is described in terms of modes for achieving this invention's objectives, it will be appreciated by those skilled in the art that variations may be accomplished in view of these teachings without deviating from the spirit or scope of the present invention.

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

A known mode for carrying out the invention is a hoof care stand for positioning the leg and hoof of a horse. The inventive hoof care stand is depicted in a perspective view in FIG. 1 and is designated therein by the general reference character 10. The hoof care stand 10 has a broad, flat base 12, for locating the hoof care stand 10 on the ground, barn floor or other surface, with a minimum of instability. It should be noted that, in this present example, the base 12 is generally round, although this is not a necessary characteristic of the invention. Also, it should be noted that the inventor has found that, while there is a range of acceptable sizes for the base, such range is not infinite. Generally, the base 12 should be sufficiently large such that the hoof care stand 12 will stand upright by itself and not tip over easily. However, the base 12 should also not be so large that it is difficult to move the hoof care stand 10 about or position it on relatively uneven ground. It has been found that the best size for the base 12 is generally in the range from about 1 foot to about 2 feet in diameter, although sizes somewhat outside this range are still considered to be within the scope of the invention. Affixed to the base 12 is an upright portion 14. In the example of the prototype embodiment of the hoof care stand 10 described herein, a washing machine agitator is used to comprise both the base 12 and upright portion.

Figure 1:
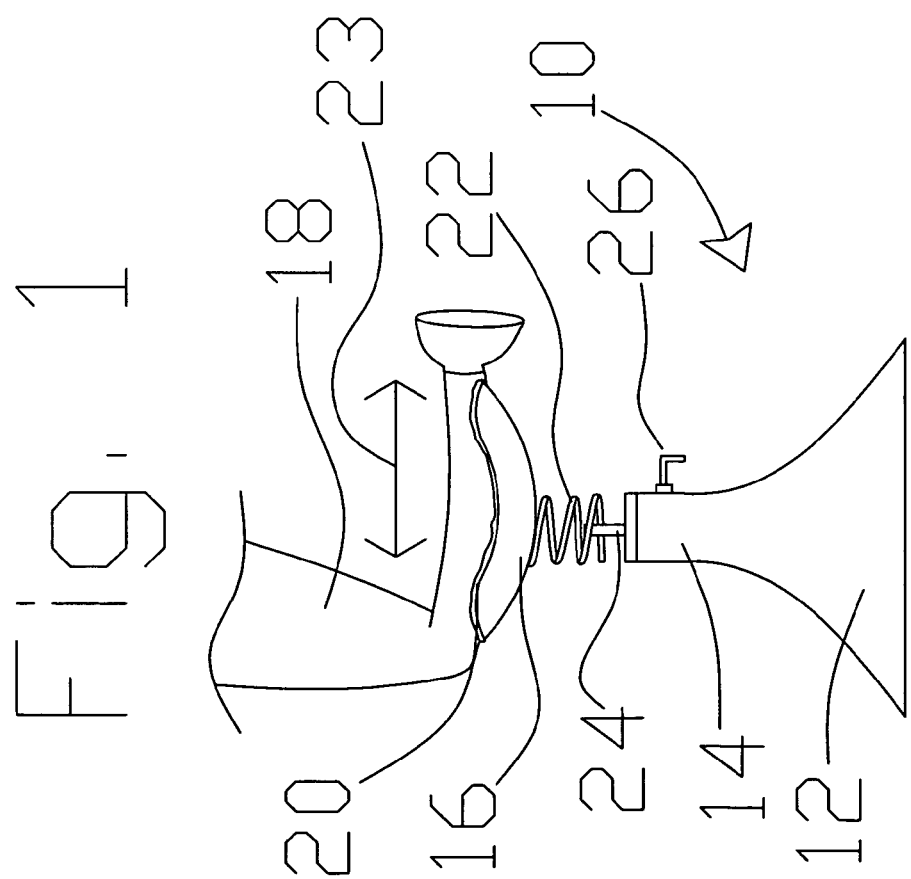
FIG. 1 is a side elevational view of an example of the inventive hoof care stand, showing a horse's front leg resting therein.

As can be seen in the view of FIG. 1, a leg receiving portion 16 forms a complex curve such that a horse's leg (a horse's front leg 18 in the example of FIG. 1) fits comfortably therein and is supported from accidentally slipping out of the leg receiving portion 16 both longitudinally and laterally. In the example of the prototype embodiment of the hoof care stand 10 described herein, the leg receiving portion 16 is a portion cut from a motorcycle fender, although any similarly shaped rigid piece could be substituted therefore in a manufactured product.

In order to protect the horse's leg 18 and also to make it comfortable for the horse, the interior of the leg receiving portion 16 is padded, in this example with close celled sheet foam rubber padding 20 which is affixed to the interior of the leg receiving portion 16 with an adhesive (not shown). Alternative padding materials, such as sheep skin padding, or the like, could be used for the purpose.

According to the described embodiment of the hoof care stand 10, the leg receiving portion is flexibly attached to the upright portion 14 by a flexible attaching member 22 which, in this example, is a spring. The flexible attaching member 22 is sufficiently stiff such that the horse's leg 18 will be retained generally in its desired position, but the flexible attaching member 22 also provides sufficient movement such that slight movements of the horse tend to be absorbed rather than causing the hoof care stand 10 to tip over. Also, the slight flexibility provided by the flexible attaching member 22 has been found to make it somewhat easier to position the horse's leg 18 therein. Finally, the flexibility provided by the flexible attaching member 22 also provides some measure of safety in that, should the horse move so much that the stand tips over, the flexible attaching member 22 will bend and allow the hoof care stand 10 to fall free from the horse without injuring the horse or the human user, as might a more rigid fixture. In the view of FIG. 1 the movement of the leg attaching member 22 that is provided by the flexible attaching member 22 is represented by an arrow 23. One skilled in the art will recognize that the arrow 23 is merely an example of a potential direction of movement, since a spring such as used in this embodiment of the invention to form the flexible attaching member 22 can readily be moved in any of several directions.

An attachment rod 24 is rigidly affixed to the flexible attaching member 22 by welding it thereto in this example, although other means of attachment are within the scope of the invention. The distal end of the attachment rod 24 is inserted into the upright portion 14 of the base 12 and held in position therein by an adjusting screw 26. As can be appreciated in light of this description and the view of FIG. 1, the height of the leg receiving portion 16 can be adjusted in height relative to the base 12 by loosening the adjusting screw 26, moving the attachment rod 24 selectively up or down relative to the base 12, and then retightening the adjusting screw 26.

FIG. 2 is a side elevational view of the example of the inventive hoof care, similar to the view of FIG. 1 except that FIG. 2 illustrates how a horse's rear leg 18a might be placed therein.

FIG. 3 is a partially exploded perspective view of the example of the hoof care stand 10 of FIGS. 1 and 2. In the view of FIG. 3 it can be seen that the attachment rod 24 is elongated such that it extends into the attachment rod receiving aperture 28 (FIG. 4) of the upright portion 14 such that the relative height of the leg receiving portion 16 can be adjusted, as previously described herein, and further such that the leg receiving portion 16 is stable within the upright portion 14 when the adjusting nut 30 is screwed in and secured against the attachment rod 24. An adjusting nut 32 is rigidly affixed, by welding in this present example, to the upright portion 14 such that the adjusting screw 26 is threaded through the adjusting nut 30 and can be screwed in and out of the upright portion 14 as previously described herein.

FIG. 4 is a top plan view of an example of the base 12 of the hoof care stand 10. In the view of FIG. 4 it can be seen that there is an attachment rod receiving aperture 28 generally in the center of the upright portion 14 of the base 12. The attachment rod receiving aperture 28 receives the attachment rod 24 and provides for movement of the attachment rod 24 relatively further into or out of the attachment rod receiving aperture 28, as required by the user.

FIG. 5 is a partially cut away perspective view of the leg receiving portion 16 of FIGS. 1 and 2. As can be seen in the perspective view of FIG. 5, the leg receiving portion 16 is curved both longitudinally and laterally, as is typical of the shape of a motorcycle fender, from which this example of the leg receiving portion 16 is cut. This shape generally tends to help position and hold the horse's leg 18 or 18*a* (FIGS. 1 and 2) therein. As discussed previously herein, the padding 20 is affixed to an interior surface 32 of the leg receiving portion 16. In the view of FIG. 4 the interior surface 32 can be seen through a partial cut away of the padding 20.

Various modifications may be made to the invention without altering its value or scope. For example, while this invention has been described herein in terms of a flexible attaching member 22 in the form of a coil spring, other flexible members could be used for the purpose. Similarly, different sizes of coil springs might be employed for the purpose. In like manner, although in the example of the invention described herein the base 12 and upright portion 14 are formed as a single unit, separate portions could be joined together to form this structure. Yet another example of the many possible variations of the invention would be to alter the curvature and/or size of the leg receiving portion 16 while retaining the general structure and advantages of the invention as described herein.

While specific examples of the inventive hoof care stand 10 have been discussed herein, it is expected that there will be a great many applications for these which have not yet been envisioned. Indeed, it is one of the advantages of the present invention that the inventive method and apparatus may be adapted to a great variety of uses.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention. The inventive hoof care stand 10 is intended to be widely used in a great variety of applications. It is expected that it will be particularly useful in applications wherein ease of use and the comfort and safety both of a horse and the human user are important considerations. The hoof care stand 10 can be used either for shoeing a horse, or for more routine maintenance, such as cleaning the hooves, and the like.

Since the hoof care stand 10 of the present invention may be readily produced and integrated with existing methods of hoof care, and the like, and since the advantages as described herein are provided, it is expected that it will be readily accepted in the industry. For these and other reasons, it is expected that the utility and industrial applicability of the invention will be both significant in scope and long-lasting in duration.

I claim:

1. A hoof care stand consisting of:
   a base;
   an upright portion projecting generally upward from the base;
   a leg receiving portion for accepting and supporting a leg therein;
   a flexible attaching member for attaching the leg receiving portion to the top of the upright portion in such a manner that the leg receiving portion is held in a generally fixed position but also such that some movement of the leg receiving portion relative to the upright portion is provided by the flexure of the flexible attaching member; an attachment rod affixed to the lower end of the flexible attaching member and further inserted into an aperture in the upright portion such that the flexible attaching member is movable relative to the upright portion by the act of sliding the attachment rod selectively into or out of the aperture;
   and an adjustment mechanism for adjusting the height of the leg receiving portion.

2. The hoof care stand of claim 1, wherein:
   the flexible attaching member includes a spring.

3. The hoof care stand of claim 1, wherein:
   the flexible attaching member includes a coil spring.

4. The hoof care stand of claim 1, wherein:
   the leg receiving portion is curved longitudinally.

5. The hoof care stand of claim 1, wherein:
   the leg receiving portion is curved across its width.

6. The hoof care stand of claim 1, wherein:
   the leg receiving portion forms a generally compound curve such that it is curved both longitudinally and across its width.

7. The hoof care stand of claim 1, wherein:
   the leg receiving portion is curved generally in the shape of a portion of a conventional motorcycle fender.

8. The hoof care stand of claim 1, wherein:
   the leg receiving portion is padded on an interior surface thereof.

9. The hoof care stand of claim 1, wherein:
   the leg receiving portion has a foam padding adhered to an interior surface thereof.

10. The hoof care stand of claim 1, wherein the adjustment mechanism includes
    an adjusting screw capable of being tightened against the attachment rod in order to prevent unwanted movement of the attachment rod through the aperture.

11. The hoof care stand of claim 10, wherein the adjustment mechanism includes
    an adjusting nut rigidly affixed to the upright portion for accepting the adjusting screw.

12. The hoof care stand of claim 1, wherein:
    relative motion between the leg receiving portion and the upright portion is controlled exclusively by the flexible attaching member.

13. The hoof care stand of claim 1, wherein:
    the flexible attaching member is an elongated member having a first end, a second end, and a longitudinal axis;
    the first end of the elongated member is fixed to the leg receiving portion;
    the second end of the elongated member is fixed to the upright portion; and
    the flexure of the flexible attaching member causes at least one of the first end and the second end to be displaced from the longitudinal axis.

14. A horse hoof care stand for receiving and holding a leg of a horse, consisting of:
    a base unit having a generally flat base and an upright portion centrally upending from the base unit;
    a leg receiving apparatus including an upwardly curved portion for receiving the leg;
    a flexible member for connecting the leg receiving apparatus to the upright portion such that the leg receiving apparatus is movable relative to the base unit as the flexible member flexes, wherein the flexible member is an elongated member having a first end, a second end, and a longitudinal axis, the first end of the flexible member is fixed to the leg receiving apparatus, the second end of the flexible member is fixed to the base unit, as the flexible member flexes, at least one end of the flexible member is displaced from the longitudinal axis, the leg receiving apparatus is supported a spaced distance above the upright portion of the base unit by the flexible member, and relative motion between the base unit and the leg receiving apparatus is controlled exclusively by the flexible member; and an adjustment mechanism for adjusting the height of the leg receiving apparatus.

15. The horse hoof care stand of claim 14, wherein; the leg receiving apparatus is curved in at least two dimensions such that the leg is supported therein both longitudinally and laterally.

16. The horse hoof care stand of claim 14, wherein: the leg receiving apparatus is padded on the interior thereof.

17. The horse hoof care stand at claim 14, wherein the adjustment mechanism includes
a post slidably received in the upright portion and further affixed to the flexible member for being raised and lowered relative to the base.

18. The horse hoof care stand of claim 17, wherein the adjustment mechanism includes
a locking mechanism for selectively securing the post in position relative to the upright portion.

* * * * *